No. 664,328. Patented Dec. 18, 1900.
A. LE BLANC.
LIQUID LEVEL INDICATOR.
(Application filed Apr. 20, 1900.)
(No Model.)
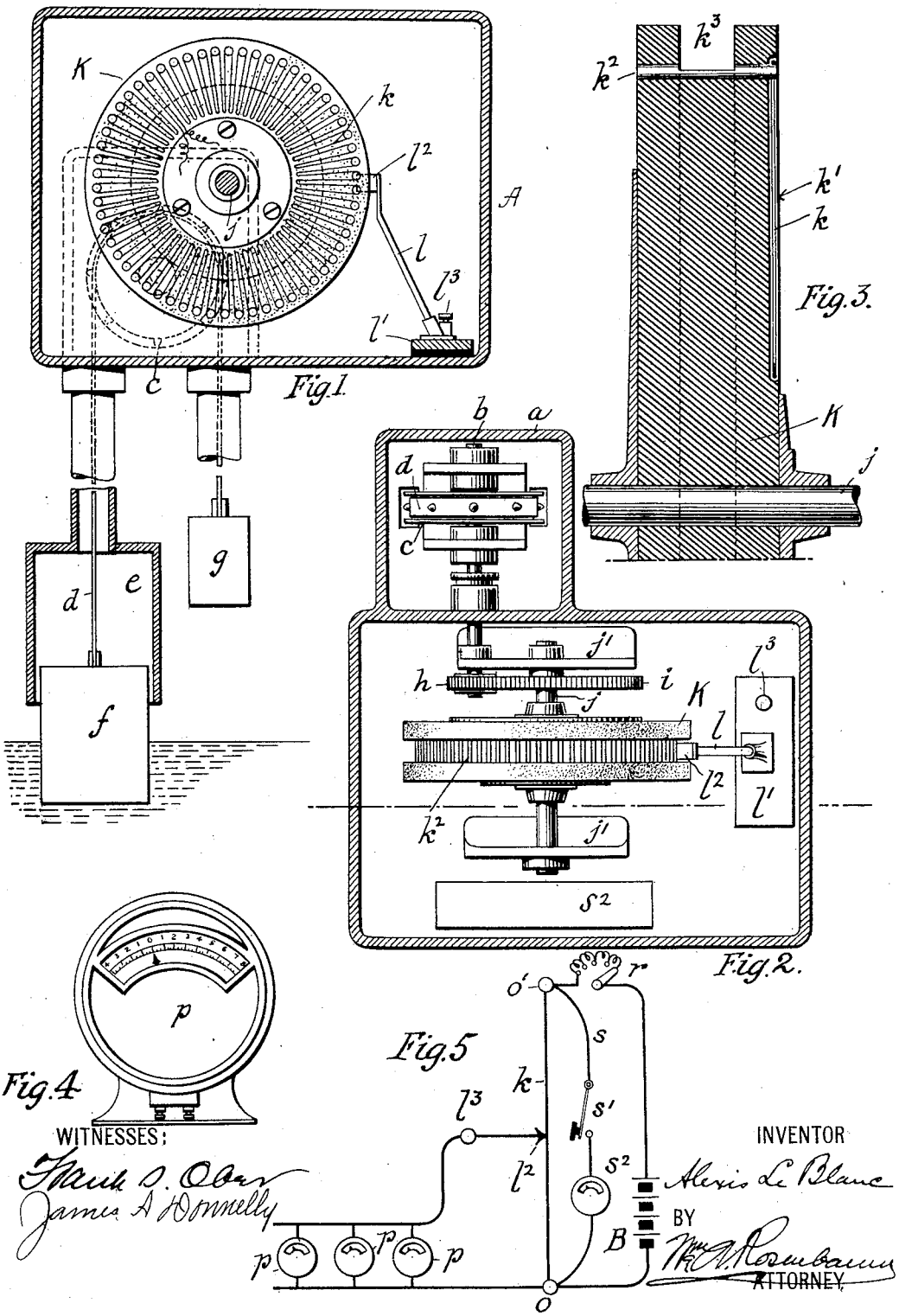
WITNESSES:
INVENTOR
Alexis Le Blanc
BY
ATTORNEY

UNITED STATES PATENT OFFICE.

ALEXIS LE BLANC, OF NEW YORK, N. Y.

LIQUID-LEVEL INDICATOR.

SPECIFICATION forming part of Letters Patent No. 664,328, dated December 18, 1900.

Application filed April 20, 1900. Serial No. 13,606. (No model.)

*To all whom it may concern:*

Be it known that I, ALEXIS LE BLANC, a citizen of the United States, residing at the city of New York, borough of Manhattan, State of New York, have invented certain new and useful Improvements in Liquid-Level Indicators, of which the following is a full, clear, and exact description.

This invention relates to tidal indicators, and in general to apparatus for indicating the level of bodies of liquids whose level is subject to change or for indicating the position of any body having a to-and-fro motion, such as an elevator or carrier, the object being to provide an instrument of simple construction which can be relied upon for accuracy.

The invention consists of a fixed electrical resistance placed in circuit with a source of current of constant electromotive force in combination with an electrical contact adapted to traverse the resistance in accordance with movements of the liquid-level, to thereby vary the difference of potential between said contact and one of the terminals of the resistance, which difference of potential is caused to effect an indicating instrument or instruments.

The invention also consists of other combinations and details of construction, all of which will be fully hereinafter described, and particularly pointed out in the claim.

In the accompanying drawings, Figure 1 is a side elevation of the apparatus except the indicating instrument, the casing being in section. Fig. 2 is a plan of the apparatus, the casing being in horizontal section. Fig. 3 is a radial section of the wheel upon which the electrical resistance is carried. Fig. 4 is a front view of the indicating instrument, and Fig. 5 is a diagram of the circuits.

Referring to the drawings by letter, A indicates a casing having an extension $a$. In the latter is suitably mounted upon a shaft $b$ a sprocket-wheel $c$, over the top of which passes a perforated tape or chain $d$. One end of this chain leads downward through a float box or guide $e$ and connects with a float $f$, sustained upon the surface of the body of water or liquid whose level is to be indicated. The other end of the chain leads downward and connects with a counterweight $g$ of such size as to insure a constant degree of immersion of the float $f$. The shaft $b$ passes through the wall of the casing A and carries a pinion $h$, engaging with a gear $i$ on the shaft $j$, suitably mounted in bearings $j'$ $j'$. On this shaft is also rigidly mounted a disk K, preferably of insulating material, and having disposed on one of its faces a high-resistance conductor of electricity in the form of a wire $k$, bent to form a series of radial loops extending nearly, if not quite, around the entire circle of the disk. These loops lie in grooves $k'$ and connect, respectively, at their outer ends, by means of solder or otherwise, with pins $k^2$, extending through the thickness of the disk near its edge. A central annular groove $k^3$ is formed in the periphery of the disk of such depth as to cut into and expose a flat surface on each of the pins $k^2$.

In the same plane with the groove $k^3$ of the disk is an arm $l$, of conducting material, fixed to the bracket $l'$ and provided with a contact $l^2$, projecting into the groove $k^3$ and resting against the bottom thereof. The bracket $l'$, which is insulated from the casing, as shown in Fig. 1, is provided with a binding-post $l^3$ for the attachment of a conducting-wire.

The indicating instrument, Fig. 4, is an ordinary galvanometer specially wound and having a scale indicating "feet" or fractions thereof and calibrated to suit the maximum limits of the movement of the particular body of water or liquid whose movements are to be indicated.

The electrical circuits are as follows: A source of electricity (indicated at B) has its terminals connected directly with the respective terminals $o$ and $o'$ of the resistance $k$. This source of electricity is preferably a battery capable of giving a constant electromotive force to insure a constant difference of potential between the terminals of the known and fixed resistance $k$. For the purpose of adjusting this difference of potential a rheostat $r$ may be inserted in the circuit of the battery B. One of the terminals of the resistance $k$—say $o$—is connected with one of the binding-posts of the indicating instrument $p$, while the wire leading from the binding-post $l^3$ is connected with the other binding-post of the instrument $p$, it being obvious that any number of the instruments $p$ may be connected in parallel in the same circuit.

The operation is as follows: The movement of the float $f$ by the tide or by a change of level from any cause will be communicated to the wheel $c$ and thence through the gears $h$ and $i$ to the resistance-wheel K. The movement of the resistance-wheel will shift the resistance $k$ with respect to the contact $l^2$, or, by reference to the diagram, the contact $l^2$ will be moved toward or away from the terminal $o$, and so alter the difference of potential between the points $o$ and $l^2$, which difference of potential will be responded to by each of the instruments $p$, whose indices will point to the mark on the scale indicating the level of the body of liquid.

For the purpose of ascertaining the voltage of the battery at any time a testing-circuit $s$, containing a key $s'$ and a voltmeter $s^2$, may be connected across the terminals $o$ and $o'$. These devices will preferably be located in or upon the casing A for convenient manipulation. Whenever the test shows a voltage above or below the normal, the rheostat $r$ is used to make the necessary adjustment.

One of the principal uses of this invention is at coast-defense fortifications in connection with range-finders for the guns. The state of the tide must be taken into the calculation when the position and range of a target are determined, and the indicating instruments $p$ may be located at the range-finders and at any other place or places desired. Another important use for the invention is in connection with stand-pipes, water-tanks, and large vats. The apparatus may also be used to indicate the position of an elevator-car by arranging the parts so that the motion of the car will be transmitted to the gearing which moves the disk K, and locating the instruments $p$ at each floor. Likewise the movements of any body which has a fixed traverse can be indicated. In these cases the scale in the indicators will not always be in feet.

Having described my invention, I claim—

A liquid-level indicator, consisting of a float resting upon the body of liquid, a counterweight for the float, a cord connecting the float and counterweight, a train of gearing over one of the wheels of which said cord passes, a disk rotated by said gearing, a rheostat carried by said disk, the disk being provided with a groove in its periphery, section-terminals of the rheostat in the form of pins passing through said disk and exposed in the bottom of said groove, a contact adapted to traverse the groove, a source of electricity in series with the rheostat, and an indicating instrument one terminal of which is connected with one terminal of the resistance while its other terminal is connected with said contact, substantially as described.

In witness whereof I subscribe my signature in presence of two witnesses.

ALEXIS LE BLANC.

Witnesses:
WM. A. ROSENBAUM,
JAMES A. DONNELLY.